United States Patent

[11] 3,586,973

[72] Inventors Robert A. Lawton;
 Charles McKay Allred, both of Boulder, Colo.
[21] Appl. No. 884,952
[22] Filed Dec. 15, 1969
[45] Patented June 22, 1971
[73] Assignee The United States of America as represented by the Secretary of Commerce

[54] STANDARD FIELD STRENGTH METER
7 Claims, 3 Drawing Figs.
[52] U.S. Cl. .................................................. 324/72,
 343/100 AP, 343/703, 343/807
[51] Int. Cl. .................................................. G01r 31/02
[50] Field of Search .................................. 324/72;
 343/100 AP, 703, 908, 807; 325/67, 363, 119

[56] References Cited
UNITED STATES PATENTS
| | | | |
|---|---|---|---|
| 1,923,916 | 8/1933 | Darbord | 343/703 |
| 3,307,108 | 2/1967 | Induni | 325/119 |
| 3,428,896 | 2/1969 | Schweitzer | 325/119 |

Primary Examiner—Michael J. Lynch
Attorneys—David Robbins and Alvin J. Englert

ABSTRACT: A hollow conductive sphere having a narrow insulated gap along an equator is suspended in a radio frequency electromagnetic field with the plane of the gap perpendicular to the electric field vector. The sphere halves are electrically connected together by a series resonant LC circuit disposed in the sphere. The resonant circuit is tuned to the frequency of the field. The field impinging on the sphere causes a current to flow across the equator of the sphere, via the resonant circuit. The field strength can accurately be related to the resonant current by an analysis of the scattering of the field by the sphere. To measure the current, the sphere contains a circuit for detecting the voltage developed across the inductance of the LC circuit and for energizing a miniature incandescent lamp when the detected voltage exceeds a threshold value. The light from the lamp is visible through a small diameter tube disposed through the sphere wall (the tube is a waveguide below cutoff for the impinging field). The sphere thus provides an optical indication when the field exceeds a threshold or standard field value. The sphere is calibrated by adjusting the threshold circuit to cause the lamp to light when the appropriate radio frequency current is passed through the resonant circuit. The calibration current is applied to the sphere by means of two hollow conductors of the same diameter as the sphere which are connected to the two sphere halves near the equator containing the insulated gap. The two hollow conductors form the inner conductor of a coaxial line. The calibration current applied to the coaxial line thus flows across the gap just as the induced current does when the sphere is in the field being tested.

PATENTED JUN22 1971

3,586,973

THRESHOLD VOLTAGE DETECTING CIRCUIT

INVENTORS
R. A. Lawton
C. M. Allred

BY Alvin J. Englert

AGENT 3,586,973

STANDARD FIELD STRENGTH METER

BACKGROUND OF THE INVENTION

This invention relates to field strength meters, and more particularly to a meter for establishing standard field strength electromagnetic fields. The standard field may be used to calibrate secondary field strength meters, for example. The meter may also be used as an accurate near field meter.

Field strength meters presently are calibrated by the standard field or the standard antenna method. The standard field method uses a specially designed monopole and the standard antenna method uses a specially designed receiving loop or dipole. The specified uncertainty in measurements made with these standards is taken to be twice the average percentage difference between measurements made by both methods. At present the uncertainty in the frequency range of 30MHz to 1,000 MHz is ± 12 percent, which is excessive for many users.

SUMMARY OF THE INVENTION

The present invention establishes a standard field or measures a field with a relatively low measurement uncertainty over the above frequency range. This is accomplished by relating field strength to the basic quantity current (radio frequency), which presently can be measured with high accuracy. The relation of field strength to current is made by means of a conductive sphere placed in the field. The sphere scatters the field, and in the process a current flows across an equator of the sphere located in a plane perpendicular to the electric field vector. The current, which increases with increasing field strength, can be precisely related to the field strength by well-known electromagnetic field equations.

DESCRIPTION OF THE PREFERRED EMBODIMENT

Figure 1:
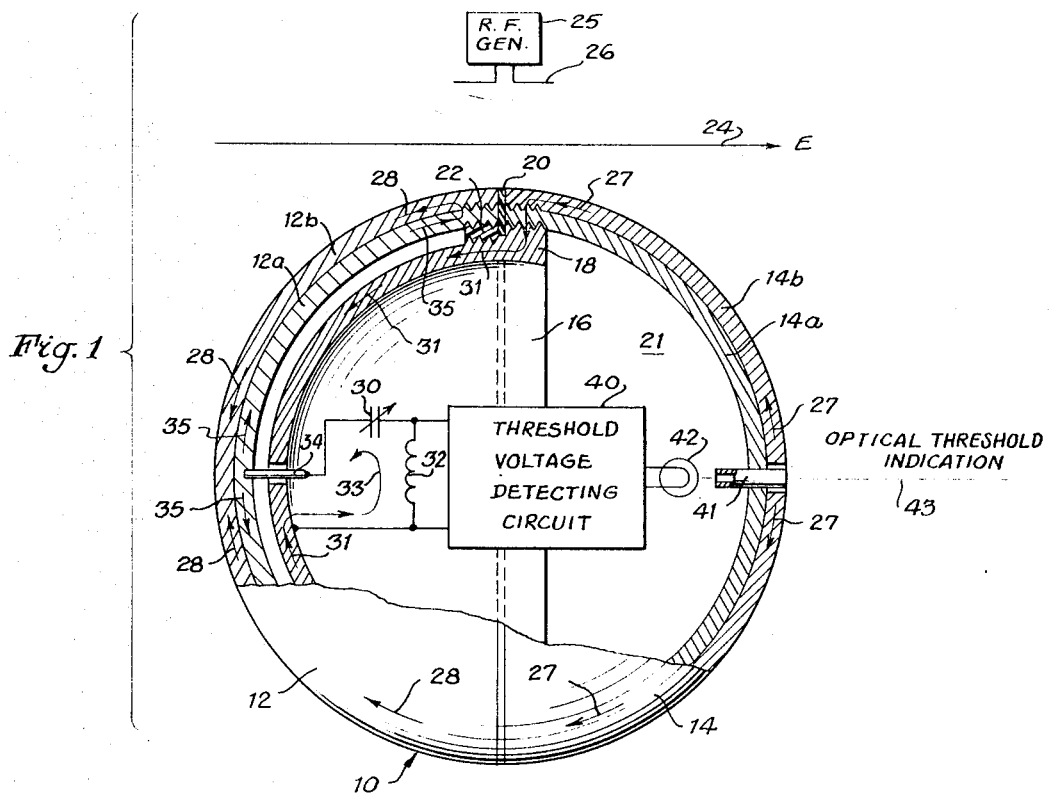
FIG. 1 is a partly sectioned and partly diagrammatic top plan view of a preferred embodiment of a sphere constructed in accordance with this invention.

The standard field meter shown in FIG. 1 comprises a hollow conductive sphere 10 formed from two hemispherical shells 12, 14. The shells 12, 14 are screwed onto an inner conductive shield 16 having a threaded rim 18, a thin dielectric flange 20, and a threaded dielectric annulus 22 of the same outer diameter as the rim 18. The shells 12, 14 are thus secured together and insulated from each other. In addition, the dielectric flange 20 defines a narrow insulated gap along an equator of the sphere 10, and the shield 16 and shell 14 provide a hollow spherical enclosure 21 that is shielded from any electromagnetic field that might leak through the gap.

The hemispherical shells 12, 14 each comprise inner and outer contiguous shells 12a, 12b, and 14a, 14b secured together by screw threads. The purpose of these contiguous shell pairs will be described hereinafter.

The sphere 10 is suspended as by a dielectric filament (not shown) in a plane wave front electromagnetic field 24 supplied by radio frequency generator 25 and antenna 26 located at a distance from the sphere. The plane of the equatorial gap in the sphere is perpendicular to the electric field vector of the incident field. This causes a current to tend to flow across the gap, as indicated by the arrows 27, 28. To complete the circuit for the current, a capacitor 30 and an inductance 32 are connected in series between the two hemispherical shells 12, 14. The capacitor 30 is connected to a pin 34 which is secured to the shell 12a and which extends through a small aperture provided in the shield 16. The inductance 32 is connected to the shield 16 which is connected by the threaded rim 18 to the shell 14. The current thus flows toward the gap as represented by the arrows 27, through the shield 16 as represented by the arrows 31, through inductance 32 and capacitor 30 as represented by arrow 33, through pin 34 and along the inside of shell 12a as represented by the arrows 35, and then away from the gap as represented by the arrows 28. The capacitor 30 and inductance 32 are tuned to resonate at the frequency of the field supplied by the RF generator 25, to provide a low impedance path for the current 33. The sphere 10 thus reacts with, or scatters, the field 24 as though the sphere were a solid conductive sphere.

From an analysis of the scattering of a plane wave by a sphere, it can be shown that the strength or amplitude of the filed is related to the current flowing across an equator normal to the electric vector by the expression $E = I/3\pi\epsilon\omega^2$   (1) where $E$ is the field amplitude; $I$ is the current, $\epsilon_0$ the permittivity of free space, $\omega$ is the angular frequency of the field, and $R$ is the radius of the sphere. Thus the strength of field 24 of FIG. 1 can be accurately determined by a measurement of the current flowing across the equator of the sphere 10.

The current 33 flowing through the resonant circuit 30, 32 develops a voltage across the inductance 32. A threshold voltage detecting circuit 40 is disposed in the sphere 10 to detect when this voltage, which is linearly related to the current at the gap, exceeds a predetermined threshold value, and to energize a miniature incandescent lamp 42 when the threshold is exceeded. The light from the lamp 42 is visible through a small diameter tube 41 that is secured to shell 14a and that projects through an aperture in shell 14b. The sphere 10 thus provides an optical indication along the axis 43 when the strength of the field 24 exceeds a threshold value. Conveniently, the threshold is set, as will be described below, to an integral value, such as 100 volts per meter.

The inner diameter of the tube 41 should be small enough that the tube is a waveguide below cutoff for the field 24, to prevent the field from inducing spurious signals in the voltage detecting circuit 40.

The circuit 40, the LC circuit 30, 32 and the lamp 42 are mounted in any convenient miniaturized fashion, as on one or more printed circuit boards (not shown), secured to the shield 16.

Figure 2:
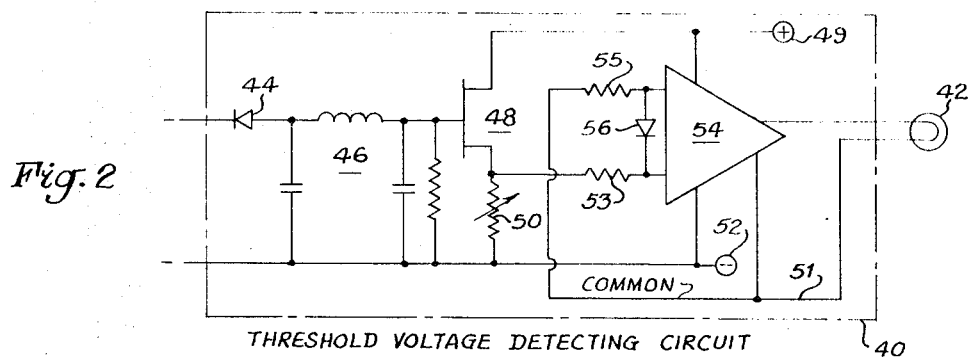
FIG. 2 is a diagram of the circuit for measuring the current induced on the sphere of FIG. 1.

As shown in the detailed circuit diagram of FIG. 2, the RF voltage from the inductance 32 is rectified by a diode 44 and filtered by a low pass filter 46. The resultant signal is applied to the gate of a field effect transistor 48 connected in source follower fashion, to provide a high impedance for the diode 44. The drain of transistor 48 is connected to a supply of positive voltage 49, and the source is connected through a resistor 50 to a supply of negative reference voltage 52. The other terminals (not shown) of the supplies 49, 52 are connected to a common bus or lead 51. This forms a voltage dividing circuit whereby the voltage at the source of transistor 48 with respect to the common lead 51 is negative until the input signal applied to the gate reaches a threshold value, when it becomes zero. The input signal required to drive the source to zero can be readily controlled as by varying the reference voltage 52 or the source resistor 50.

The source voltage and common voltage are applied to a differential amplifier 54 via resistors 53 and 55, respectively. A diode 56 is connected between these inputs, with the anode connected to the common voltage input and the cathode connected to the source voltage input. Thus when the source voltage is negative, the diode 56 is forward biased and effectively connects the amplifier inputs together, causing the output signal to be zero. The miniature lamp 42 is connected to receive the output signal. When the source voltage becomes zero or positive, the diode 56 is back biased (has a high impedance), and the amplifier 54 then amplifies any voltage difference to produce an output signal. Thus the lamp 42 is lit or energized when the emitter voltage slightly exceeds zero. Since the source voltage is driven to zero when the voltage applied to the gate of transistor 48 reaches a threshold value, and since the gate voltage is directly related to the strength of the electromagnetic field 24 impinging on the sphere 10, the lamp 42 is lit when the field strength slightly exceeds a threshold value. Adjustment of the threshold circuit 40 thus sets the threshold field strength that lights the lamp 42.

Figure 3:
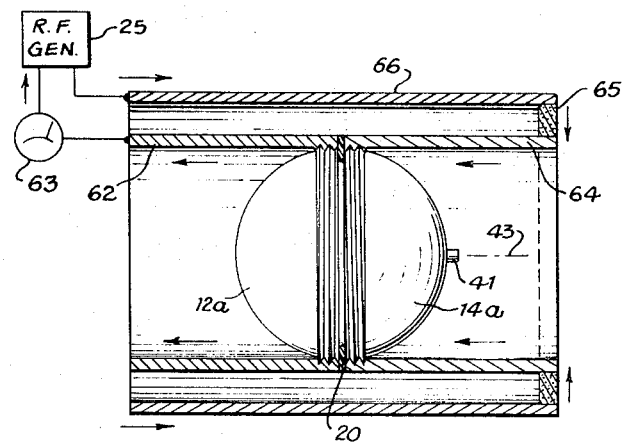
FIG. 3 is a cross-sectional view of a coaxial transmission line apparatus for calibrating the sphere and circuit of the invention.

To adjust the threshold circuit 40 to light the lamp at a field strength threshold of, say, 100 volts per meter, the amount of current corresponding to this field, as given by expression (1) above, must be made to flow over the sphere 10. FIG. 3 shows an arrangement for obtaining this current flow on the sphere.

In FIG. 3, the outer hemispherical shells 12b, 14b have been removed from the sphere 10, and a pair of internally threaded hollow conductors 62, 64 are screwed onto the inner shells 12a, 14a in their stead. (This is the reason for the inner and outer shells.) The conductors 62, 64 are insulated from each other by the thin dielectric flange 20. The conductors, 62, 64 and sphere are mounted in an outer, coaxially arranged conductor 66 to form a coaxial transmission line. The radio frequency generator 25 of FIG. 1 (or another generator of the same frequency) is connected through a high accuracy radio frequency ammeter 63 to one end of this line, and a resistive load 65 is connected to the other end. This causes current from the generator 25 to flow as indicated by the arrows in FIG. 3, that is to say: through conductor 66, load 65, conductor 64, shell 14a, across the gap via inductance 32 and capacitor 30 (as shown in FIG. 1), shell 12a, conductor 62, and ammeter 63. The current flow at the gap is thus identical to the current flow illustrated in FIG. 1, where the sphere is suspended in the field 24.

In calibrating the sphere, the threshold circuit 40 (FIG. 2) is adjusted so that the sphere produces the optical indication along axis 43 when the ammeter 63 just reads the current value corresponding to the desired threshold (100 volts per meter, as described above). This may require the sphere and coaxial line of FIG. 3 to be disassembled and reassembled several times, in order to adjust the circuit 40 mounted in the sphere. If desired, the sphere could be provided with means for adjusting the circuit 40 (e.g., resistor 50) through a small aperture (not shown) in the shell 14.

The operation of the standard field meter will be obvious from the foregoing. The sphere is suspended in the field 24 which is to be adjusted to a standard field strength, or which is to be measured, by any suitable means such as a dielectric filament. The sphere is oriented so that the plane of the gap is perpendicular to the electric field vector. If the direction of this vector is unknown, the sphere should be rotated with suitable means and the field level adjusted so that the lamp 42 turns on at only one orientation during the rotation. At this orientation, the sphere gap will be normal to the electric field vector. With the sphere properly oriented, the incident field level 24 is then adjusted until the lamp 42 lights. This will establish a standard field of a value given by expression (1) above, where $I$ was the current reading of the ammeter 63, FIG. 3, taken when the lamp just lit during the calibration run. If the incident field level is not adjustable, but is to be measured, the threshold circuit 40 in the sphere is adjusted until the lamp condition changes, that is, lights or extinguishes. The sphere is then placed in the calibrating apparatus of FIG. 3 and the lamp change is duplicated by adjusting the RF generator 25. The current level at the change condition is read on ammeter 63 and the field corresponding to this current is obtained from expression (1).

We claim:
1. In combination with a source of radio frequency electromagnetic field, a standard field strength meter comprising:
a hollow conductive sphere having a narrow insulated gap along an equator thereof, said sphere being suspended in said field with the plane of said gap perpendicular to the electric vector of said field,
a series resonant circuit disposed in said sphere and connected between the two halves thereof, said resonant circuit being tuned to the frequency of said field,
means disposed in said sphere for detecting the voltage developed across a portion of said resonant circuit by said field impinging on said sphere, and for generating an optical signal when said detected voltage exceeds a threshold value, and
means for transmitting said optical signal through said sphere, whereby said sphere provides an optical indication when the strength of said field exceeds an accurately predetermined field strength value.

2. Apparatus as set forth in claim 1, wherein said hollow conductive sphere contains:
a generally hemispherical conductive inner shield having a threaded rim, a threaded dielectric annulus of the same outer diameter as said rim, and a thin dielectric flange disposed between said threaded rim and annulus,
said halves of said sphere being screwed to said rim and said annulus with said flange therebetween, whereby said halves are secured together and insulated by said annulus and flange, and said shield and the sphere half screwed to the rim of said shield define a shielded volume within said sphere.

3. Apparatus as set forth in claim 2, wherein said series resonant circuit comprises:
a capacitor and an inductance,
said inductance having one end connected to said shield and the other end connected to one end of said capacitor,
a pin connected to the sphere half screwed to said dielectric annulus, said pin extending through an aperture provided in said shield,
the other end of said capacitor being connected to said pin.

4. Apparatus as set forth in claim 3, wherein said voltage detecting means comprises:
means for rectifying the voltage developed across said inductance,
means for filtering the output of said rectifying means, and
means for generating an output signal when the output of said filtering means exceeds a threshold value.

5. Apparatus as set forth in claim 4, wherein said optical signal generating means comprises a miniature incandescent lamp energized by said output signal generating means.

6. Apparatus as set forth in claim 5, wherein said output signal generating means comprises:
a field effect transistor having a gate, source, and drain,
said gate being connected to the output of said filtering means,
said source being connected through a resistor and negative potential supply to a common line,
said drain being connected through a positive potential source to said common line,
a differential amplifier having said transistor source and said common line connected to the inputs thereof, and
a diode connected between the inputs of said differential amplifier to short said inputs together until the voltage of said source exceeds the voltage of said common line,
said lamp being connected to the output of said differential amplifier.

7. Apparatus as set forth in claim 2, wherein said optical signal transmitting means comprises a tube disposed through one of said sphere halves, the diameter of said tube being sufficiently small that the tube is a waveguide below cutoff for said radio frequency field.

UNITED STATES PATENT OFFICE
CERTIFICATE OF CORRECTION

Patent No. 3,586,973          Dated June 22, 1971

Inventor(s) Robert A. Lawton and Charles McKay Allred

It is certified that error appears in the above-identified patent and that said Letters Patent are hereby corrected as shown below:

Column 2, line 13, "filed" should read --field--; line 14, the expression should read: $E = 1/3 \, \pi \, \epsilon_o \, \omega \, R^2$ Signed and sealed this 9th day of November 1971.

(SEAL)
Attest:

EDWARD M. FLETCHER, JR.
Attesting Officer

ROBERT GOTTSCHALK
Acting Commissioner of Patents